United States Patent
Zhu (10) Patent No.: US 11,645,338 B2
(45) Date of Patent: May 9, 2023

(54) METHOD, APPARATUS AND DEVICE, AND STORAGE MEDIUM FOR CONTROLLING DISPLAY OF COMMENTS (71) Applicant: BEIJING YOUZHUJU NETWORK TECHNOLOGY CO., LTD., Beijing (CN)

(72) Inventor: Lijun Zhu, Beijing (CN)

(73) Assignee: BEIJING YOUZHUJU NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/291,427

(22) PCT Filed: Jan. 22, 2020

(86) PCT No.: PCT/CN2020/073800
§ 371 (c)(1),
(2) Date: May 5, 2021

(87) PCT Pub. No.: WO2020/233169
PCT Pub. Date: Nov. 26, 2020

(65) Prior Publication Data
US 2022/0004581 A1    Jan. 6, 2022

(30) Foreign Application Priority Data
May 21, 2019   (CN) .................... 201910425932.3

(51) Int. Cl.
*G06F 16/9035*    (2019.01)
*G06F 16/957*     (2019.01)
(Continued)

(52) U.S. Cl.
CPC ........ *G06F 16/9035* (2019.01); *G06F 3/0484* (2013.01); *G06F 3/04817* (2013.01); *G06F 16/9577* (2019.01)

(58) Field of Classification Search
CPC ............ G06F 16/9035; G06F 3/04817; G06F 3/0484; G06F 16/9577; G06F 9/451; G06Q 30/0282
See application file for complete search history.

(56) References Cited

U.S. PATENT DOCUMENTS 9,277,024 B2 *  3/2016  Scherpa .................. H04L 51/52
9,450,769 B2 *  9/2016  Wolff .................. H04L 12/1813
(Continued)

FOREIGN PATENT DOCUMENTS

CN    107180032 A    9/2017
CN    107180041 A    9/2017
(Continued)

OTHER PUBLICATIONS

Author: The Internet Patrol Title: What does Hiding a Comment on Facebook Actually Do? And How to Hide or Delete a Comment Date: Jan. 6, 2019 pp. 1-4 (Year: 2019).*
(Continued)

*Primary Examiner* — Kavita Stanley
*Assistant Examiner* — Phoebe X Pan
(74) *Attorney, Agent, or Firm* — BakerHostetler (57) ABSTRACT

An embodiment of the disclosure provides a comment content display method, apparatus and device, and storage medium, the method including: when any parent comment of a content object includes at least one child comment, display a comment hiding button at a preset position in a comment region of the parent comment; and filter out the parent comment and child comments of the parent comment from all the comments that have been currently loaded and displayed in response to a trigger operation of a user for the comment hiding button, and updating a current display (Continued)

interface to display other comment contents except the filtered out parent comment and child comments of the parent comment.

13 Claims, 5 Drawing Sheets

(51) Int. Cl.
  *G06F 3/04817* (2022.01)
  *G06F 3/0484* (2022.01)

(56) References Cited

U.S. PATENT DOCUMENTS

| | | | |
|---|---|---|---|
| 10,560,662 B1* | 2/2020 | Tippana | H04L 65/1069 |
| 2008/0082607 A1* | 4/2008 | Sastry | G06F 16/986 |
| | | | 707/E17.118 |
| 2009/0070376 A1* | 3/2009 | Eom | G06F 40/169 |
| 2011/0010641 A1* | 1/2011 | Wolff | G06Q 10/107 |
| | | | 715/753 |
| 2011/0271230 A1* | 11/2011 | Harris | G06F 3/0482 |
| | | | 715/810 |
| 2012/0124483 A1* | 5/2012 | Zuckerberg | H04L 51/08 |
| | | | 715/752 |
| 2013/0067334 A1* | 3/2013 | Rose | G06F 3/048 |
| | | | 715/730 |
| 2013/0097481 A1* | 4/2013 | Kotler | G06F 16/34 |
| | | | 715/230 |
| 2014/0047027 A1* | 2/2014 | Moyers | G06F 9/452 |
| | | | 709/204 |
| 2015/0134639 A1* | 5/2015 | Salituri | G06Q 50/01 |
| | | | 707/722 |
| 2015/0209677 A1* | 7/2015 | O'Brien | G06Q 50/01 |
| | | | 463/31 |
| 2016/0072755 A1* | 3/2016 | Su | H04L 51/216 |
| | | | 715/753 |
| 2018/0150437 A1 | 5/2018 | Liang et al. | |
| 2018/0278563 A1* | 9/2018 | Frost | H04L 51/52 |
| 2018/0314532 A1* | 11/2018 | Badr | G06F 3/04817 |
| 2018/0330391 A1* | 11/2018 | Clediere | G06Q 30/0203 |
| 2018/0337880 A1* | 11/2018 | Sokolov | G11B 27/34 |
| 2021/0064701 A1* | 3/2021 | Carrier | G06F 40/289 |
| 2022/0019324 A1* | 1/2022 | Lin | G06F 3/0484 |

FOREIGN PATENT DOCUMENTS

| | | |
|---|---|---|
| CN | 108595646 A | 9/2018 |
| CN | 109725803 A | 5/2019 |
| CN | 110619099 A | 12/2019 |

OTHER PUBLICATIONS

Author: MicroStrategy Title: How to get re-prompted to open schema objects in Read Only Mode or Edit Mode after having selected to "Remember my selection as default preference for future session" in MicroStrategy Desktop 9.x Date: Apr. 12, 2019 pp. 1-5 (Year: 2019).*
International Patent Application No. PCT/CN2020/073800; Int'l Search Report; dated Apr. 21, 2020; 2 pages.

* cited by examiner

METHOD, APPARATUS AND DEVICE, AND STORAGE MEDIUM FOR CONTROLLING DISPLAY OF COMMENTS

The disclosure is the U.S. National Stage of International Application No. PCT/CN2020/073800, filed on Jan. 22, 2020, which claims priority to Chinese Patent Application No. 201910425932.3 filed on May 21, 2019, the entire contents of which are incorporated herein by reference.

TECHNICAL FIELD

The embodiments of the present disclosure relate to the technical field of computer software applications, for example to a comment content display method, apparatus and device, and storage medium.

BACKGROUND

Users can comment on a certain content object on some news media platforms, social platforms or shopping platforms, or send a child comment on a certain comment. In a comment region, comment contents are usually displayed in chronological order of commenting. When a child comment of a certain parent comment appears behind a comment at the same level as the parent comment, the content of the parent comment is also displayed along with the child comment, causing repetition of a large number of displayed contents. Therefore, when a user refreshes backwards, comments that the user sees are most likely to have been already read.

For example, a piece of news contains three comments, one of which has caused extensive discussion. There is a plurality of child comments under this comment. A parent comment of each child comment would be displayed at the same time when child comments that are commented later than the three news comments are displayed. Parent comments would be repeatedly displayed for multiple times when there are a larger number of child comments, resulting in repetition and redundancy of the displayed contents.

If the content length of a parent comment is greater and there are a larger number of child comments, this parent comment of a great length appears repeatedly, which greatly affects the reading speed and the information extraction efficiency.

SUMMARY

The embodiments of the present disclosure provide a comment content display method, apparatus and device, and storage medium, so as to achieve the effect that when a large number of child comments appear under any parent comment of a certain content object, repeatedly displayed parent comment and child comments are filtered out according to a selection of a user during displaying of comment contents to avoid repetition and redundancy of the displayed contents, thereby improving the reading efficiency of the user and the information extraction speed.

On a first aspect, an embodiment of the disclosure provides a comment content display method, including: In the case that a parent comment of a content object contains at least one child comment, displaying a comment hiding button at a preset position in a comment region of the parent comment; and filtering out the parent comment and child comments of the parent comment from all the comments that have been currently loaded and displayed in response to a trigger operation of a user for the comment hiding button, and updating a current display interface to display other comment contents except the filtered out parent comment and child comments of the parent comment.

On a second aspect, an embodiment of the disclosure provides a comment content display apparatus, including: a button display module, disposed to in the case that a parent comment of a content object contains at least one child comment, display a comment hiding button at a preset position in a comment region of the parent comment; a comment filtering module, disposed to filter out the parent comment and child comments of the parent comment from all the comments that have been currently loaded and displayed in response to a trigger operation of a user for the comment hiding button, and updating a current display interface to display other comment contents except the filtered out parent comment and child comments of the parent comment.

On a third aspect, an embodiment of the disclosure provides an electronic device, including: at least one processor; and a memory, configured to store at least one program, when the at least one program is executed by the at least on processor, the at least one processor implementing the comment content display method according to any one of embodiment of the disclosure.

On a fourth aspect, an embodiment of the disclosure further provides a computer-readable storage medium, storing a computer program, wherein the computer program, when executed by a processor, implements the comment content display method according to any one of embodiment of the disclosure.

DETAILED DESCRIPTION OF THE EMBODIMENTS

The following will clearly and completely describe the technical solutions of the present disclosure through implementations with reference to the drawings in the embodiments of the present disclosure. Obviously, the described embodiments are a part of the embodiments of the present disclosure, rather than all of them. Based on the embodiments in the present disclosure, all other embodiments obtained by those of ordinary skill in the art without creative work shall fall within the protection scope of the present disclosure. In the following embodiments, each embodiment provides optional features and examples at the same time. The various features recorded in the embodiments can be combined to form multiple alternative solutions. Each numbered embodiment should not be regarded as It is a technical solution.

Figure 1A:
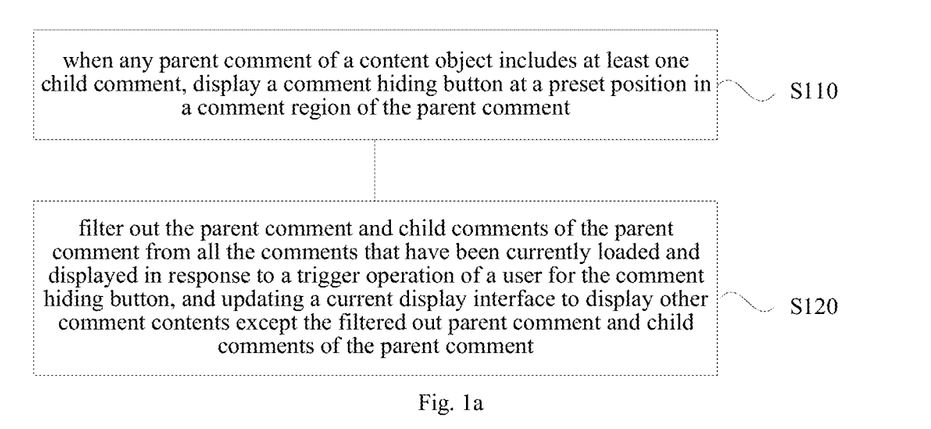
FIG. 1a is a flowchart of a comment content display method provided by Embodiment I of the present disclosure.

FIG. 1a illustrates a flowchart of a comment content display method provided by an embodiment of the present disclosure. The embodiments of the present disclosure can be applicable to cases that any parent comment of any content object contains child comments and the parent comment and child comments are repeatedly displayed. The method can be implemented by a comment content display device, and can be specifically implemented by means of software and/or hardware in electronic equipment.

As shown in FIG. 1a, a comment content display method provided by the embodiments of the present disclosure comprises: step S110 and step S120.

In step S110, in the case that a parent comment of a content object contains at least one child comment, displaying a comment hiding button at a preset position in a comment region of the parent comment.

The content object can be any piece of news, picture or story and other contents of a news media platform, or can be any commodity and other contents on a shopping platform. These content objects can all be used as commented objects. For one content object, different comments and communication popularities can be triggered according to its content. It is indicated that this content object is extremely popular when there are many people commenting on one content object or comments of the content object.

In an embodiment, in the comment region of the content object, a comment display mode is displaying comments according to the popularities and/or commenting time of all the comments. If one comment is a popular comment, it is indicated that many people agree with this comment, or there are more discussions triggered by this comment. That is, this comment contains at least one child comment or comments of the child comment.

Figure 1B:
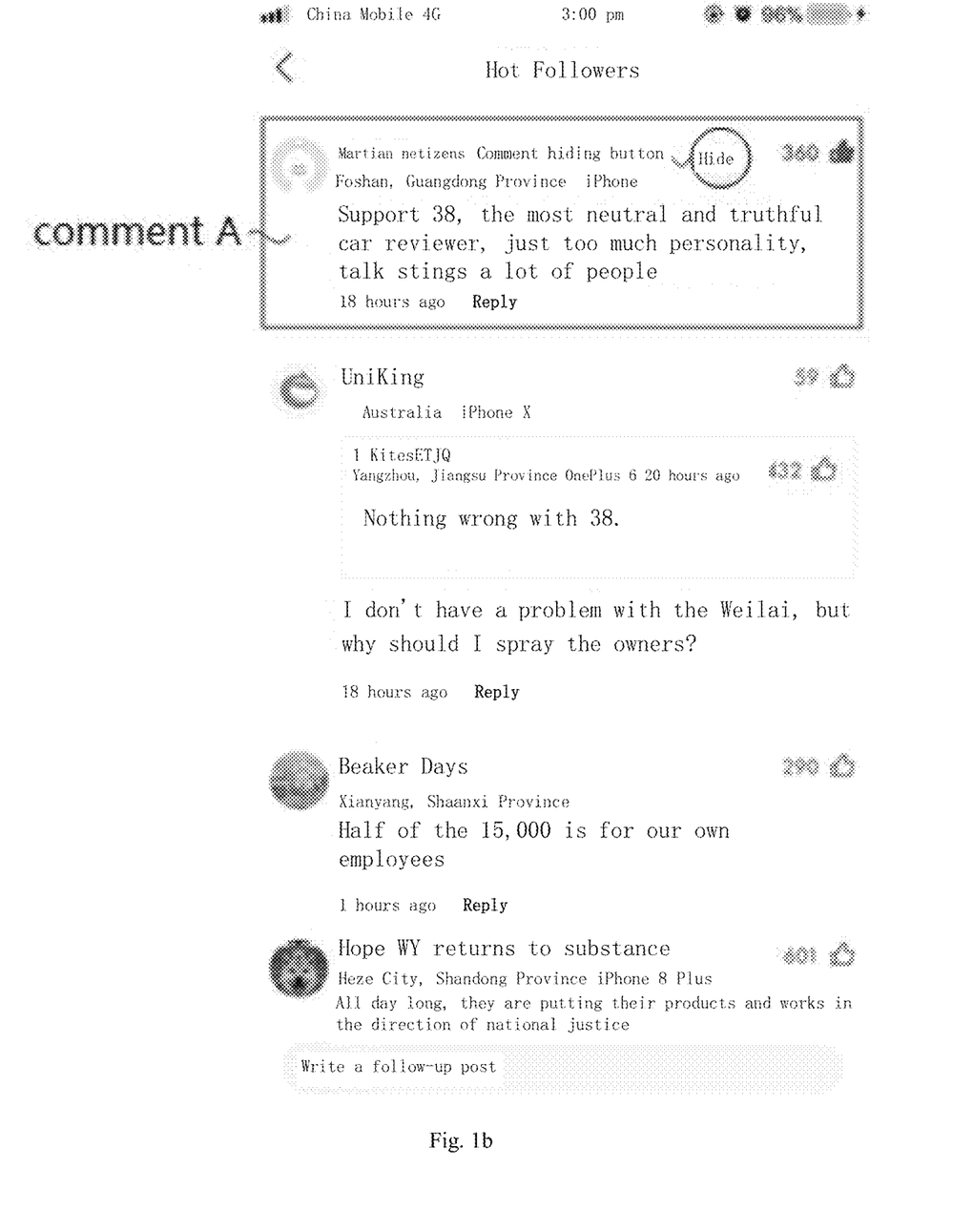
FIG. 1b is a schematic diagram of parent comment displaying provided by Embodiment I of the present disclosure.
Figure 1C:
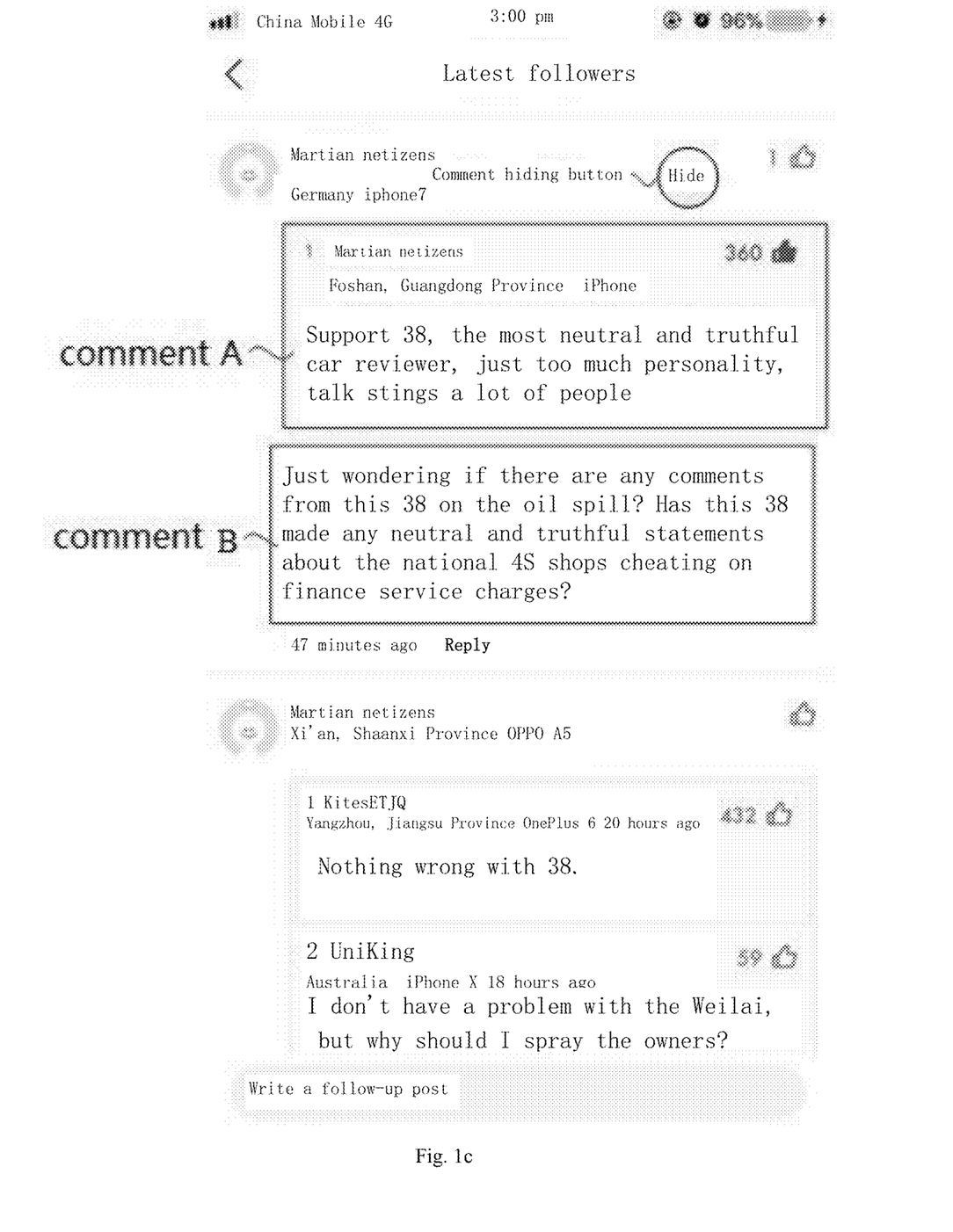
FIG. 1c is a schematic diagram of repeated displaying of a parent comment and a child comment provided by Embodiment I of the present disclosure.

In one comment display mode, an order for displaying the comment contents is determined in combination with the popularities and the commenting time of all the comments. The comment with higher popularity is displayed at first; then the comments with equivalent popularities are displayed in chronological order. For example, comments having the commenting time closest to the current time are displayed preferentially. As such, there can be one situation during actual displaying: One popular parent comment is displayed at a relatively front position, and even it is a comment displayed at the first line. On a comment content display interface as shown in FIG. 1b, when the comment region is opened, the first line displayed is a more popular comment A. When a user slides a display interface, the user can see more comment contents. As shown in FIG. 1c, a child comment (i.e., a comment B) of the comment A is displayed in the comment region. It can be seen that the content of the comment A is displayed at the same time during displaying of the comment B. When the comment A further comprises more child comments, the comment A would be displayed at the same time during each displaying of one child comment. If the comment B also comprises one child comment C (the child comment C is not shown in the figure), the contents of the comment A and the comment B would be displayed at the same time during displaying of the comment C. As such, some comments would be displayed repeatedly for multiple times, affecting the reading experience of users who are not interested in the content of the comment A and its child comments, so that the users may feel boring because of much repeated content and have lower information reading efficiency, thus failing to quickly find content that the users are interested in from the comment contents.

In the present embodiment, when there is a comment being a parent comment, which contains at least one child comment, one comment hiding button is displayed in a display region of the parent comment to represent that this comment contains at least one child comment, and may be repeatedly displayed at least once during displaying of more comment contents, referring to the comment hiding button shown in FIG. 1b. When a user is not interested in this parent comment, i.e. comment A, and does not want to read the repeatedly displayed comment A and the child comments of the comment A at pulling of more comment contents, the user can click this comment hiding button.

Further, the comment hiding button is an icon or a prompt text. The shape of the icon is not specifically limited in the present embodiment. It can be rectangular, square, circular or crossed and in other shapes. The prompt text can be "hide, filter, shield, or not interested" and other contents, which can definitely inform the user of its function. Further, this comment hiding functional button can also be shown in the form of an icon and prompt text combination.

In step S120, filtering out the parent comment and child comments of the parent comment from all the comments that have been currently loaded and displayed in response to a trigger operation of a user for the comment hiding button, and updating a current display interface to display other comment contents except the filtered out parent comment and its child comments.

When the user clicks the comment hiding button, a client that displays the content object can filter out the comment A and child comments of the comment A from the comments that have already been loaded and displayed.

In an embodiment, the client only displays a preset number of comments when displaying the comment contents of the content object. For example, when one content object is opened, 20 comments are loaded and displayed only by default. A request for loading more comment contents is sent to a server only when the user slides the display interface to pull down more comment contents, and the number of comments requested to be loaded at each time is also limited. For example, at each time when comment contents are requested to be loaded, only 20 new comment contents are loaded. The new comment contents comprise comments on a content object, which are at the same level as the existing comment A, and child comments of the comment A.

When the user does not pull down more new comment contents, the user clicks the comment hiding button to filter out the comment and its child comments that are selected to be hidden from the comment contents that have been currently loaded and displayed, and to update the current display interface and display the filtered comment contents. Therefore, the user will no longer read the comment content that the user is not interested in, thereby improving the comment reading efficiency, and the user can determine an interested viewpoint faster from unread comments.

In an embodiment, after the user performs the trigger operation on the comment hiding button, and before the parent comment and the child comments of the parent comment are filtered out from all the comments that have been currently loaded and displayed, a comment hiding time limit prompt box can also be displayed on the display interface for the user to select whether the current comment hiding operation is temporary hiding or permanent hiding. If the user selects to hide the comments permanently, when the user opens the content object again after closing the current content object, the comment contents displayed are comment contents from which the comment and the child comments which are hidden by the user are filtered out.

In an embodiment, when the trigger operation of the user for the comment hiding button is not received, the comment hiding button is displayed at a preset position of a repeated display region of the parent comment and/or child comments of the parent comment. In an embodiment, at the moment when the user reads one comment content, the user does not think how many times this comment will be repeated, or the user does not have clear liking or disliking in the comment, so the user does not click the comment hiding button to hide this comment and its child comments. When the user slides the display interface to check more comment contents, it is possible that the user reads more repeated comment contents, and the user hopes to filter out this comment. The comment hiding button is displayed at a preset position of a repeated display region of this comment and/or child comments of this comment, and the user can conveniently filter and hide uninterested comment contents at any time.

In the comment content display method provided by the embodiments of the present disclosure, the comment hiding button is displayed in the parent comment content display region containing the child comments, so that if the user presses this button, this parent comment and its child comments are filtered out from the displayed comment contents, thereby solving the problem of repetition and redundancy of the displayed contents due to the fact that the parent comment and/or the child comments are repeatedly displayed for multiple times, achieving the goal of filtering out, according to a reading requirement of the user, the repeatedly displayed parent comment and child comments, and improving the reading efficiency of the user and the information extraction speed.

Figure 2:
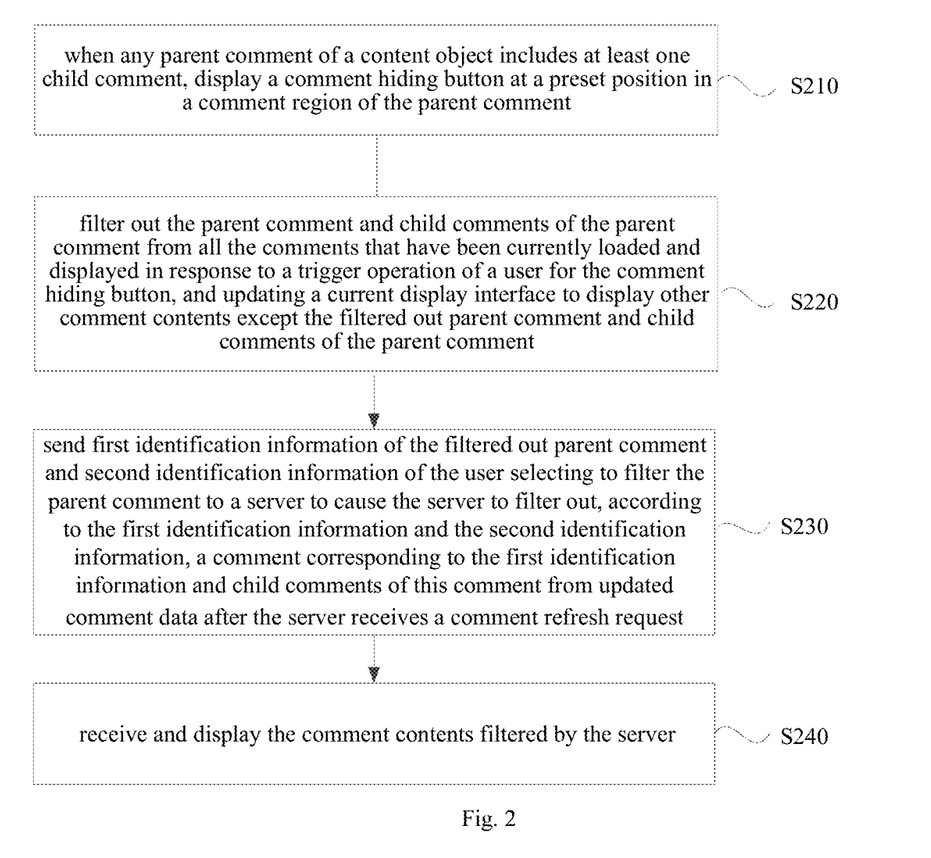
FIG. 2 is a flowchart of a comment content display method provided by Embodiment II of the present disclosure.

FIG. 2 is a flowchart of a comment content display method provided by an embodiment of the present disclosure. The present embodiment is materialized based on the optional solutions in the above-mentioned embodiments. As shown in FIG. 2, a comment content display method provided in the embodiments of the present disclosure comprises the following step S210 to step S240.

In step S210, when any parent comment of a content object includes at least one child comment, display a comment hiding button at a preset position in a comment region of the parent comment.

In step S220, filtering out the parent comment and child comments of the parent comment from all the comments that have been currently loaded and displayed in response to a trigger operation of a user for the comment hiding button, and updating a current display interface to display other comment contents except the filtered out parent comment and its child comments.

The specific contents of the step S210 and the step S220 can refer to the related descriptions of the step S110 and the step S120 in the above embodiment.

In step S230, sending a first identification information of the filtered out parent comment and a second identification information of the user selecting to filter the parent comment to a server to cause the server to filter out, according to the first identification information and the second identification information, a comment corresponding to the first identification information and child comments of this comment from updated comment data after the server receives a comment refresh request.

When a user clicks the comment hiding button, a client that displays a content object can automatically record the first identification information of the hidden parent comment, and the second identification information of the user clicking the comment hiding button, i.e., determine which user filters out which comment content. The client can then send the first identification information and the second identification information to the server. Therefore, when the user sends the comment refresh request to the server to acquire more comment contents, the server can determine, according to the received first identification information and second identification information, whether the user sending the comment refresh request selects to hide a certain comment content. If the user selects to hide the certain comment content, the server would filter out the parent comment and its child comments which are selected by the user to be hidden before sending more comment contents to the client, and only send the filtered comment contents to the client of the user.

In in embodiment, if the user selects a comment hiding time limit, after it is determined whether the current comment hiding operation of the user is temporary hiding or permanent hiding, the client sends the first identification information of the filtered out parent comment, the second identification information of the user selecting to filter the parent comment and the comment hiding time limit to the server to cause the server to determine, according to the comment hiding time limit, whether to filter out, according to the first identification information and the second identification information, the filtered parent comment and the child comments of the parent comment from the comment contents of the content object when the content object and the comments are closed and then displayed again. In an embodiment, when the user closes the content object and then opens the same again, if the comment hiding time limit is temporary, the comment contents of the content object will not be filtered, and the comment contents of the content object are displayed just like the user opens the content comments for the first time; if the comment hiding time limit is permanent, the operation of the user for opening the content object for the first time is remembered, and the filtered parent comment and child comments of the parent comment are filtered out from the comment contents of the content object according to the first identification information and the second identification information. Therefore, the phenomenon that the user repeatedly selects to hide the corresponding comment content is avoided.

In another embodiment, a function option for remembering the selection of the comment hiding time limit can also be displayed while a comment hiding time limit prompt box is displayed. If the user selects to remember the comment hiding time limit, when the user triggers the comment hiding button again, a terminal can automatically record a time limit of the comment hiding operation of the user, and report the time limit to the server to cause the server to determine whether to perform, according to the comment hiding time limit, the first identification information and the second identification information, a filtering operation on the comment contents to be sent to the client.

In step S240, receiving and displaying the comment contents filtered by the server.

After filtering the comment contents according to the first identification information and the second identification information which are uploaded by the client, or the first identification information, the second identification information and the comment hiding time limit information, the server can send the filtered comment contents to the client, and the client displays the corresponding comment contents. In the comment content display method provided by the embodiments of the present disclosure, the comment hiding button is displayed in the parent comment content display region containing the child comments, so that if the user presses this button, this parent comment and its child comments are filtered out from the displayed comment contents, and after the user presses the comment hiding button, identification information of the hidden comment and the identification information of the user are uploaded to the server, so that the user can acquire the filtered comment contents when requesting for more comment contents, thereby solving the problem of repetition and redundancy of the displayed contents due to the fact that the parent comment and/or the child comments are repeatedly displayed for multiple times, achieving the goal of filtering out, according to a reading requirement of the user, the repeatedly displayed parent comment and child comments, and improving the reading efficiency of the user and the information extraction speed.

Figure 3:
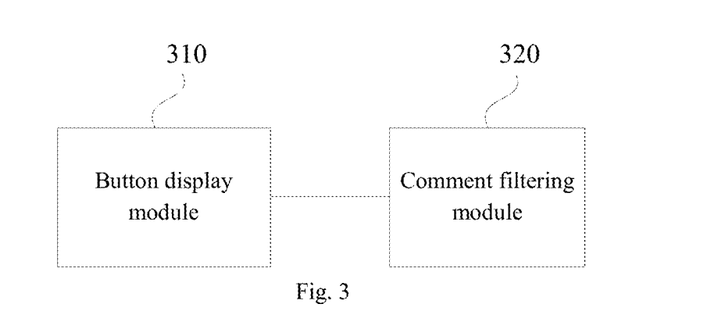
FIG. 3 is a structural schematic diagram of a comment display apparatus provided by Embodiment III of the present disclosure.

FIG. 3 illustrates a structural schematic diagram of a comment content display device provided by an embodiment of the present disclosure. The embodiment of the present disclosure can be applicable to cases that any parent comment of any content object contains child comments and the parent comment and child comments are repeatedly displayed.

As shown in FIG. 3, the comment content display apparatus in the embodiment of the present disclosure comprises: a button display module 310 and a comment filtering module 320.

The button display module 310 is disposed to in the case that a parent comment of a content object contains at least one child comment, display a comment hiding button at a preset position in a comment region of the parent comment; and the comment filtering module 320 is disposed to filter out the parent comment and child comments of the parent comment from all the comments that have been currently loaded and displayed in response to a trigger operation of a user for the comment hiding button, and updating the current display interface to display other comment contents except the filtered out parent comment and its child comments.

In the comment content display apparatus provided by the embodiments of the present disclosure, the comment hiding button is displayed in the parent comment content display region containing the child comments, so that if the user presses this button, this parent comment and its child comments are filtered out from the displayed comment contents, thereby solving the problem of repetition and redundancy of the displayed contents due to the fact that the parent comment and/or the child comments are repeatedly displayed for multiple times, achieving the goal of filtering out, according to a reading requirement of the user, the repeatedly displayed parent comment and child comments, and improving the reading efficiency of the user and the information extraction speed.

In an embodiment, the apparatus further comprises an identification information sending module, disposed to, after acquiring a trigger operation of a user for the comment hiding button, send a first identification information of the filtered out parent comment and a second identification information of the user selecting to filter the parent comment to a server to cause the server to filter out, according to the first identification information and the second identification information, a comment corresponding to the first identification information and child comments of this comment from updated comment data after the server receives a comment refresh request; and a comment content display module, disposed to receive and display the comment contents filtered by the server.

In an embodiment, the button display module is also disposed to display a comment hiding time limit prompt box for the user to select whether the current comment hiding operation is temporary hiding or permanent hiding after the user performs the trigger operation on the comment hiding button, and before the parent comment and child comments of the parent comment are filtered out from all the comments that have been currently loaded and displayed.

The identification information sending module is also disposed to: send the first identification information of the filtered out parent comment, the second identification information of the user selecting to filter the parent comment and the comment hiding time limit to the server to cause the server to determine, according to the comment hiding time limit, whether to filter out, according to the first identification information and the second identification information, the filtered parent comment and child comments of the parent comment from the comment contents of the content object when the content object and the comments are closed and then displayed again.

In an embodiment, the action of determining, according to the comment hiding time limit, whether to filter out, according to the first identification information and the second identification information, the filtered parent comment and child comments of the parent comment from the comment contents of the content object comprises: not filtering the comment contents of the content object when the comment hiding time limit is temporary; filtering out the filtered parent comment and child comments of the parent comment from the comment contents of the content object according to the first identification information and the second identification information when the comment hiding time limit is permanent.

In an embodiment, the apparatus further comprises a comment hiding time limit selection module, disposed to display a function option for remembering the selection of the comment hiding time limit while displaying a comment hiding time limit prompt box.

In an embodiment, the button display module is also disposed to: display the comment hiding button at a preset position of a repeated display region of the parent comment and/or the child comments of the parent comment when the trigger operation of the user for the comment hiding button is not received.

In an embodiment, the comment hiding button is an icon or a prompt text.

The comment content display apparatus provided by the embodiments of the present disclosure can implement the comment content display method provided by any embodiment of the present disclosure, and has corresponding functional modules and beneficial effects of the executed method.

Figure 4:
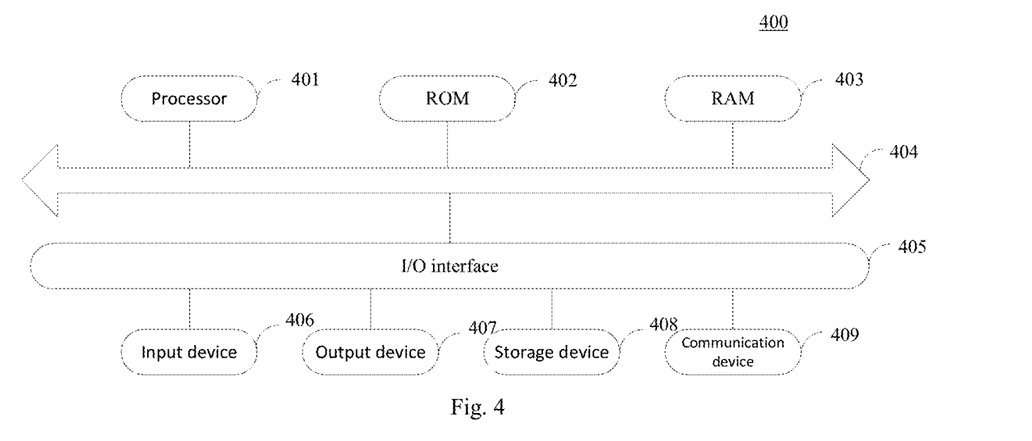
FIG. 4 is a structural schematic diagram of electronic device provided by Embodiment IV of the present disclosure.

FIG. 4 is a schematic structural diagram of an electronic device and/or server 400 suitable for implementing embodiments of the present disclosure. The electronic device and/or server in the embodiment of the disclosure may include, but is not limited to, mobile terminal such as a mobile phone, a notebook computer, a digital broadcast receiver, a personal digital assistant (PDA), portable multimedia player (PMP), vehicle terminal, (such as vehicle navigation terminal), etc., and fixed terminal such as digital television (television, TV), desktop, etc., or various forms of servers, such as stand-alone servers or server clusters. The electronic device and/or server shown in FIG. 4 is only an example, and should not bring any limitation to the function and scope of use of the embodiments of the present disclosure.

As shown in FIG. 4, the electronic device and/or the server 400 may include a processor (such as a central processing unit, a graphics processor, etc.) 401, which may be based on a program stored in a read-only memory (Read Only Memory, ROM) 402 Or, a program loaded from the memory 405 to a random access storage device (Random Access Memory, RAM) 403 performs various appropriate actions and processing. In the RAM 403, various programs and data required for the operation of the electronic device and/or the server 400 are also stored. The processor 401, the ROM 402, and the RAM 403 are connected to each other through a bus 404.

An input/output (Input/Output, I/O) interface 405 is also connected to the bus 404.

Generally, the following devices can be connected to the I/O interface 404: including input devices 406 such as touch screens, touch pads, keyboards, mice, cameras, microphones, accelerometers, gyroscopes, etc.; including, for example, liquid crystal displays (LCD), Output devices 407 such as speakers, vibrators, etc.; storage devices 408 including, for example, magnetic tapes, hard disks, etc.; and communication devices 409. The communication device 409 may allow the electronic device and/or the server 400 to perform wireless or wired communication with other devices to exchange data. Although FIG. 4 shows an electronic device and/or a server 400 having various devices, it should be understood that it is not required to implement or have all of the illustrated devices. It may alternatively be implemented or provided with more or fewer devices.

In particular, according to an embodiment of the present disclosure, the process described above with reference to the flowchart can be implemented as a computer software program. For example, an embodiment of the present disclosure includes a computer program product, which includes a computer program carried on a computer-readable medium, and the computer program includes program code configured to execute a display method of an operable control. In such an embodiment, the computer program may be downloaded and installed from the network through the communication device 409, or installed from the memory 404, or installed from the ROM 402. When the computer program is executed by the processor 401, the above-mentioned functions defined in the method of the embodiment of the present disclosure are executed.

It should be noted that the aforementioned computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, device, or device, or a combination of any of the above. More specific examples of computer-readable storage media may include, but are not limited to: electrical connections with one or more wires, portable computer disks, hard disks, random access storage devices (RAM), read-only storage devices (ROM), Erasable Programmable Read-Only Memory (EPROM) or flash memory, optical fiber, portable compact disc read-only memory (Compact Disc Read-Only Memory, CD-ROM), optical storage device, magnetic storage device, Or any suitable combination of the above. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, radio frequency (RF), etc., or any suitable combination of the foregoing.

The above-mentioned computer-readable medium may be included in the above-mentioned electronic device; or it may exist alone without being assembled into the electronic device.

The above-mentioned computer-readable medium carries one or more programs, and when the above-mentioned one or more programs are executed by the processing device, the electronic device: obtains the operable control associated with the promotion content; determines the target display information of the operable control; If the display duration of the promotion content reaches the preset duration, the original display information of the operable controls is adjusted according to the target display information.

The computer program code used to perform the operations of the present disclosure may be written in one or more programming languages or a combination thereof. The above-mentioned programming languages include object-oriented programming languages—such as Java, Smalltalk, C++, and also conventional Procedural programming language—such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network-including a local area network (, LAN) or a wide area network (, WAN), or it can be connected to an external computer (for example, using an Internet service provider) To connect via the Internet).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more for realizing the specified logic function. Executable instructions. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or it can be realized by a combination of dedicated hardware and computer instructions.

The units involved in the embodiments described in the present disclosure may be implemented in a software manner, and may also be implemented in a hardware manner. Among them, the name of the module does not constitute a limitation on the module itself under certain circumstances. For example, the acquiring module can also be described as "a module for acquiring operational controls associated with promotion content".

The invention claimed is:

1. A method of controlling display of comments, comprising:
   in response to determining that a parent comment of a content object contains at least one child comment, displaying a comment hiding button at a preset position in a comment region of the parent comment;
   filtering out the parent comment and the at least one child comment of the parent comment from all comments that have been currently loaded and displayed in response to a trigger operation of a user on the comment hiding button, and updating a current display interface to display other comments than the filtered out parent comment and the at least one child comment of the parent comment;
   wherein comments of the content object comprise the parent comment and the at least one child comment of the parent comment, and wherein after the user performs the trigger operation on the comment hiding button and before the parent comment and the at least one child comment of the parent comment are filtered out from all the comments that have been currently loaded and displayed, the method further comprises:
   displaying a comment hiding time limit prompt box for the user to select whether a current comment hiding operation is associated with temporary hiding or permanent hiding; and
   sending to a server first identification information of identifying the parent comment, second identification information of identifying the user, and a comment hiding time limit selected by the user in response to a selection operation of the user via the comment hiding time limit prompt box to cause the server to determine, based on the comment hiding time limit, whether the parent comment and the at least one child comment of the parent comment corresponding to the first identification information are to be filtered out for the user corresponding to the second identification information when the content object and the comments of the content object are closed and then displayed again.

2. The method according to claim 1, wherein after the trigger operation of the user on the comment hiding button is acquired, the method further comprises:
   cause the server to filter out, according to the first identification information and the second identification information, the parent comment corresponding to the first identification information and the child comments of the parent comment corresponding to the first identification from updated comment data in response to receiving a comment refresh request.

3. The method according to claim 1, wherein determining, based on the comment hiding time limit, whether the parent comment and the at least one child comment of the parent comment corresponding to the first identification information are to be filtered out for the user corresponding to the second identification information when the content object and the comments of the content object are closed and then displayed again further comprises:
   not filtering the comments of the content object when the comment hiding time limit is temporary; and
   filtering out the parent comment and the at least one child comment of the parent comment from the comments of the content object according to the first identification information and the second identification information when the comment hiding time limit is permanent.

4. The method according to claim 1, wherein the method further comprises:
   displaying a function option for remembering a selection of the comment hiding time limit while displaying the comment hiding time limit prompt box.

5. The method according to claim 1, wherein the method further comprises:
   displaying the comment hiding button at a preset position of a repeated display region of at least one of the parent comment or the at least one child comments when the trigger operation of the user on the comment hiding button is not received.

6. The method according to claim 1, wherein, the comment hiding button is an icon or a prompt text.

7. An electronic device, comprising:
   at least one processor; and
   at least one memory, configured to store at least one program, when the at least one program is executed by the at least on processor, the at least one processor perform operations, the operations comprising:
   in response to determining that a parent comment of a content object contains at least one child comment, displaying a comment hiding button at a preset position in a comment region of the parent comment;
   filtering out the parent comment and the at least one child comment of the parent comment from all comments that have been currently loaded and displayed in response to a trigger operation of a user on the comment hiding button, and updating a current display interface to display other comments than the filtered out parent comment and the at least one child comment of the parent comment;
   wherein comments of the content object comprise the parent comment and the at least one child comment of the parent comment, and wherein after the user performs the trigger operation on the comment hiding button and before the parent comment and the at least one child comment of the parent comment are filtered out from all the comments that have been currently loaded and displayed, the method further comprises:
   displaying a comment hiding time limit prompt box for the user to select whether a current comment hiding operation is associated with temporary hiding or permanent hiding; and
   sending to a server first identification information of identifying the parent comment, second identification information of identifying the user, and a comment hiding time limit selected by the user in response to a selection operation of the user via the comment hiding time limit prompt box to cause the server to determine, based on the comment hiding time limit, whether the parent comment and the at least one child comment of the parent comment corresponding to the first identification information are to be filtered out for the user corresponding to the second identification information when the content object and the comments of the content object are closed and then displayed again.

8. The electronic device according to claim 7, wherein, after the trigger operation of the user on the comment hiding button is acquired, the operations further comprise:

cause the server to filter out, according to the first identification information and the second identification information, the parent comment corresponding to the first identification information and the child comments of the parent comment corresponding to the first identification from updated comment data in response to receiving a comment refresh request.

9. The electronic device according to claim 7, wherein determining, based on the comment hiding time limit, whether the parent comment and the at least one child comment of the parent comment corresponding to the first identification information are to be filtered out for the user corresponding to the second identification information when the content object and the comments of the content object are closed and then displayed again further comprises:
not filtering the comments of the content object when the comment hiding time limit is temporary; and
filtering out the parent comment and the at least one child comment of the parent comment from the comments of the content object according to the first identification information and the second identification information when the comment hiding time limit is permanent.

10. The electronic device according to claim 7, wherein the operations further comprise:
displaying a function option for remembering a selection of the comment hiding time limit while displaying the comment hiding time limit prompt box.

11. The electronic device according to claim 7, wherein the operations further comprise:
displaying the comment hiding button at a preset position of a repeated display region of at least one of the parent comment or the at least one child comments when the trigger operation of the user on the comment hiding button is not received.

12. The electronic device according to claim 7, wherein, the comment hiding button is an icon or a prompt text.

13. A non-transitory computer-readable storage medium, storing a computer program, wherein the computer program, when executed by a processor, causes the processor to perform operations, the operations comprising:
in response to determining that a parent comment of a content object contains at least one child comment, displaying a comment hiding button at a preset position in a comment region of the parent comment;
filtering out the parent comment and the at least one child comment of the parent comment from all comments that have been currently loaded and displayed in response to a trigger operation of a user on the comment hiding button, and updating a current display interface to display other comments than the filtered out parent comment and the at least one child comment of the parent comment;
wherein comments of the content object comprise the parent comment and the at least one child comment of the parent comment, and wherein after the user performs the trigger operation on the comment hiding button and before the parent comment and the at least one child comment of the parent comment are filtered out from all the comments that have been currently loaded and displayed, the method further comprises:
displaying a comment hiding time limit prompt box for the user to select whether a current comment hiding operation is associated with temporary hiding or permanent hiding; and
sending to a server first identification information of identifying the parent comment, second identification information of identifying the user, and a comment hiding time limit selected by the user in response to a selection operation of the user via the comment hiding time limit prompt box to cause the server to determine, based on the comment hiding time limit, whether the parent comment and the at least one child comment of the parent comment corresponding to the first identification information are to be filtered out for the user corresponding to the second identification information when the content object and the comments of the content object are closed and then displayed again.

\* \* \* \* \*